United States Patent [19]

Schlessmann

[11] Patent Number: 5,414,934
[45] Date of Patent: May 16, 1995

[54] EXCHANGEABLE SLEEVE BEARING FOR A VEGETATION CUTTER APPARATUS

[75] Inventor: Helmut Schlessmann, Waiblingen, Germany

[73] Assignee: Andreas Stihl, Waiblingen, Germany

[21] Appl. No.: 92,823

[22] Filed: Jul. 19, 1993

[30] Foreign Application Priority Data

Jul. 21, 1992 [DE] Germany .................. 42 23 962.1

[51] Int. Cl.⁶ ...................... A01D 34/68; A01D 34/82
[52] U.S. Cl. .................................. 30/275.4; 30/276;
30/277.4; 56/12.7; 384/295; 384/296; 384/906
[58] Field of Search ................ 30/272.1, 276, 296.1,
30/500; 56/12.7; 74/502.4, 502.6; 464/52;
384/295, 296, 906

[56] References Cited

U.S. PATENT DOCUMENTS

| | | | |
|---|---|---|---|
| 1,971,436 | 7/1929 | McWhirter | 384/295 |
| 4,067,108 | 1/1978 | Ballas | 30/296.1 X |
| 4,148,141 | 4/1979 | Hoff | 30/276 |
| 4,172,322 | 10/1979 | Ballas | 30/276 |
| 4,226,021 | 10/1980 | Hoff | 56/12.7 X |
| 4,463,498 | 8/1984 | Everts | 30/296.1 |
| 4,476,632 | 10/1984 | Proulx | 30/276 |
| 4,505,040 | 3/1985 | Everts | 30/296.1 |
| 4,560,365 | 12/1985 | Weaver | 464/52 |
| 4,567,657 | 2/1986 | Krause | 30/276 |
| 4,655,032 | 4/1987 | Tanaka | 56/12.7 |
| 4,733,471 | 3/1988 | Rahe | 30/296.1 X |
| 4,779,405 | 10/1988 | Everts | 56/12.7 |
| 4,780,002 | 10/1988 | Krause | 56/12.7 X |
| 5,109,607 | 5/1992 | Everts | 56/12.7 X |
| 5,170,561 | 12/1992 | Sepke | 30/276 |
| 5,319,851 | 6/1994 | Ikezawa et al. | 384/295 X |

FOREIGN PATENT DOCUMENTS 0257566 3/1988 European Pat. Off. .

Primary Examiner—Rinaldi I. Rada
Assistant Examiner—Clark F. Dexter
Attorney, Agent, or Firm—Walter Ottesen

[57] ABSTRACT

A vegetation cutter apparatus having a drive motor which drives a cutterhead via a drive shaft journalled in a guide tube. The cutterhead is held in a sleeve bearing at the end section of the guide tube facing away from the drive motor. The cutterhead is held in a simple manner by an exchangeable sleeve bearing in the guide tube. This is achieved in that the bearing is axially held in the end section of the guide tube so as to be exchangeable and at least one stop holds the bearing against rotation and may cooperate to hold the bearing captive in the axial direction. The stop projects radially into the guide tube.

19 Claims, 6 Drawing Sheets

EXCHANGEABLE SLEEVE BEARING FOR A VEGETATION CUTTER APPARATUS

BACKGROUND OF THE INVENTION

Vegetation cutter apparatus are also known as motor-driven scythes and brushcutters and are utilized to cut vegetation such as grass, weeds and the like. The drive motor drives the cutterhead in rotation via the drive shaft guided in a guide tube. The cutterhead is held by a bearing on the lower end of the guide tube. This bearing is configured as a roller bearing which is built into an intermediate piece which is connected to one end to the guide tube and, at the other end, to the bearing stub of the cutterhead. A configuration of this kind leads to a considerable increase in weight and is furthermore complex with respect to its construction. An exchange of the roller bearing is possible only together with the intermediate piece.

SUMMARY OF THE INVENTION

It is an object of the invention to provide a vegetation cutter apparatus of the kind described above which is further improved in that the cutterhead is reliably held on the guide tube with a simple construction and wherein the bearing is easily exchanged.

The vegetation cutter apparatus of the invention includes: a drive motor; a guide tube having an end connected to the drive motor and having an end section facing away from the drive motor; a drive shaft rotatably journalled in the guide tube; the drive shaft having a first end connected to the drive motor and having a second end; a bearing mounted in the end section; a cutterhead rotatably journalled in the bearing and connected to the second end of the drive shaft so as to be driven by the drive motor via the drive shaft; holding means for holding the bearing in the end section so as to permit the bearing to be exchanged; and, the holding means including stop means for engaging the bearing to prevent an unwanted axial movement of the bearing relative to the end section.

The bearing is held in the end section of the guide tube so that it can be exchanged and is axially held in the end section of the guide tube by means of at least one portion projecting radially into the guide tube. The end section of the guide tube itself thereby defines the housing for receiving the bearing. Structural means for connecting a bearing housing to the guide tube can be omitted. The bearing can be axially withdrawn from the end section by releasing the stop projecting radially into the guide tube. In this way, the bearing can be easily exchanged.

According to a preferred embodiment of the invention, the bearing is a sleeve bearing having an outer diameter adapted to the inner diameter of the end section of the guide tube. Sleeve bearings of this kind are simple in their construction and can therefore be fixed with simple means in the end section of the guide tube.

The bearing has axial slots on its outer periphery in order to establish a rotation-fixed connection of the bearing to the guide tube in a simple manner. The stop preferably engages in the axial slots. If the stop is adapted to the form of the slot, then the stop lies in the slot in a simple manner so that there is no play in the peripheral direction whereby a connection is provided which is without play in the direction of rotation.

In a preferred embodiment of the invention, the stop is provided on a collar which engages around the end section of the guide tube which receives the bearing and preferably carries a protective shield for the cutterhead. The stop is released at the same time the protective shield is disassembled so that the cutterhead can be pulled from the guide tube whereby the vegetation cutter apparatus can be easily transported in a disassembled form. The assembly is made by a simple insertion of the bearing into the end section and the collar having the stop is tightened thereby radially clamping the bearing in the end section of the guide tube.

BRIEF DESCRIPTION OF THE DRAWINGS

The invention will now be described with reference to the drawings wherein:

FIG. 4 is a section view taken through the sleeve bearing;

DESCRIPTION OF THE PREFERRED EMBODIMENTS OF THE INVENTION

Figure 1:
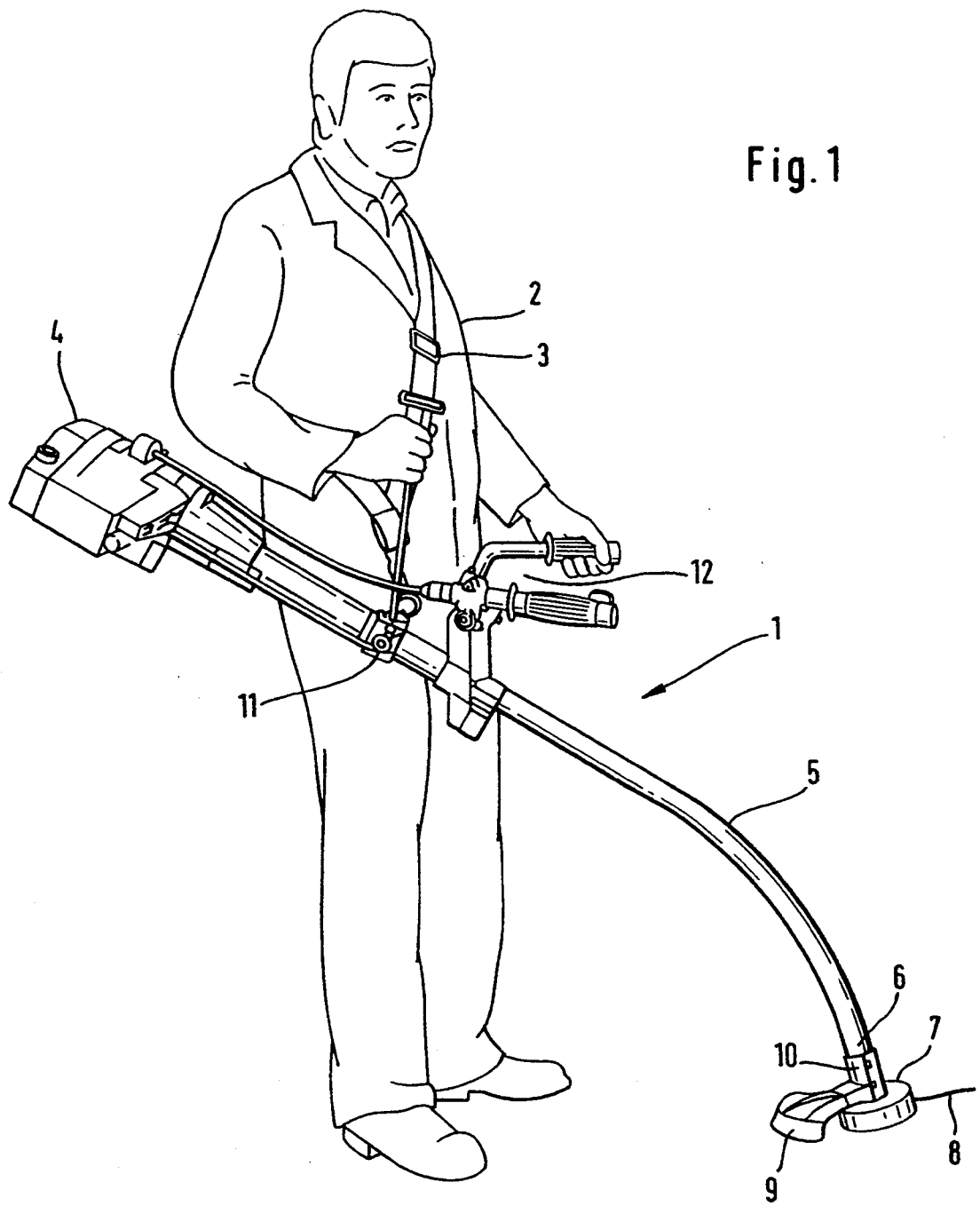
FIG. 1 is a perspective view of a vegetation cutter apparatus according to the invention with the vegetation cutter apparatus being shown held by an operator.

The vegetation cutter apparatus 1 shown in FIG. 1 is held by an operator 2 with the aid of a carrier belt 3 lying over the shoulder of the operator. The vegetation cutter apparatus includes a drive motor 4 which, in the embodiment shown, is an internal combustion engine, namely, a two-stroke engine. An electric motor can also be used. The drive motor 4 drives a drive shaft which is journalled in a bent guide tube 5. A cutterhead 7 is held in a bearing on the lower end section 6 of the guide tube 5. In the embodiment shown, the cutterhead 7 is a filament cutter which has at least one filament segment 8 projecting out of the cutterhead 7. The filament segment 8 acts as a cutting tool. A protective shield 9 is arranged above the cutterhead 7 and extends over a portion of the periphery. The protective shield 9 is attached by means of a collar 10 to the guide tube 5. The collar 10 is preferably made of steel and engages around the end section 6 of the guide tube 5 in which the bearing is received.

The carrier belt 3 is connected at approximately the gravity center 11 of the vegetation cutter apparatus. A handle bar 12 attached to the guide tube 5 is used by the operator to guide the vegetation cutter apparatus. Operator-actuated elements as required for the drive motor 4 are mounted on the handle bar.

Figure 2:
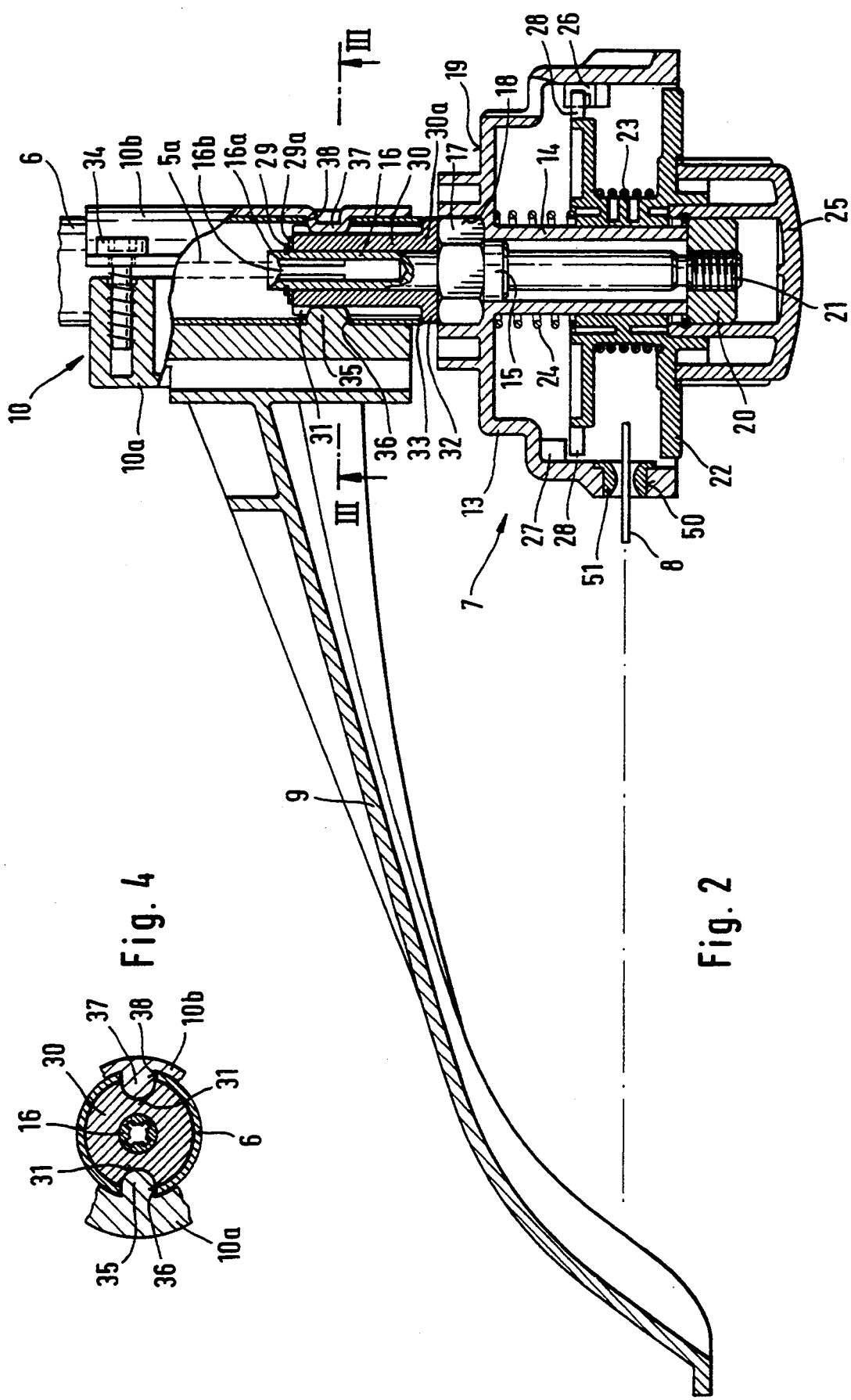
FIG. 2 is a section view taken through a cutterhead held on the lower end of the guide tube of the vegetation cutter apparatus.

As shown in FIG. 2, the cutterhead 7 essentially comprises a cup-shaped base housing 13 which has an opening facing away from the end section 6. A cylindrical tube 14 is configured as one piece with the base housing 13 and is disposed at the center thereof. The cylindrical tube 14 receives a shaft stub 15. The shaft stub 15 has a form-locking section 17 configured in the manner of a nut at approximately the mid length thereof. The shaft stub 15 has a bearing section 16 extending upwardly from form-locking section 17.

The form-locking section 17 is seated in a receiving opening 18 so that it cannot rotate relative thereto. The receiving opening 18 is on the end face 19 of the base housing 13 facing toward the end section 6. The form-locking section 17 lies against an annular shoulder of the base housing 13 with an end face of the section 17 facing away from the end section 6 so that, after a nut 20 is threadably engaged on the threaded section 21 of the shaft stub 15 projecting out of the cylinder 14, the shaft stub 15 is connected to the base housing 13 of the cutter-head 7 so that the shaft stub 15 cannot rotate relative to the base housing and cannot axially separate therefrom.

A supply spool 22 for the cutting filament 23 is rotatably journalled on the cylinder 14 and a helical spring 24 presses the supply spool against an actuating cap 25 projecting from the cutterhead 7. The actuating cap 25 is braced axially on nut 20. In the position shown, a stop 28 arranged on the periphery of the supply spool 22 lies against an inner stop 26 of the base housing 13 so that the supply spool is entrained in the rotational direction of the cutterhead. The supply spool 22 is axially displaced by depressing the cap 25 so that the stop 28 becomes disengaged from the stop 26 and the supply spool rotates relative to the base housing 13 until one of the stops 28 comes into contact engagement with a stop 27 of the base housing. The stop 27 is axially displaced in elevation from the stop 26. The cutting filament 23 unwinds from the supply spool because of the relative movement and the filament segment 8 defining the cutting tool is extended. The indexing device configured in this manner is actuated by bumping the cutterhead on the ground. The supply spool 22 undergoes a return movement because of the action of the helical spring 24 and this causes a further movement of the supply spool 22 relative to the base housing 13 so that a further filament segment 8 is unwound. The filament segment 8 extends to the outside through the wall of the base housing 13 which is preferably made of plastic. A metal bushing 51 is riveted into the pass-through opening 50 of the wall in order to prevent the filament segment 8 from becoming welded in this pass-through opening.

A sleeve bearing 30 is seated on the bearing section 16 of the shaft stub 15. The bearing section 16 faces toward the end section 6 and projects through the sleeve bearing 30. A retaining ring 29 is fixed on the projecting end 16a thereby holding the sleeve bearing 30 on the bearing section 16 so that it cannot axially separate therefrom. Preferably, a washer 29a is disposed between the retaining ring 29 and the end face of the sleeve bearing 30.

Figure 3:
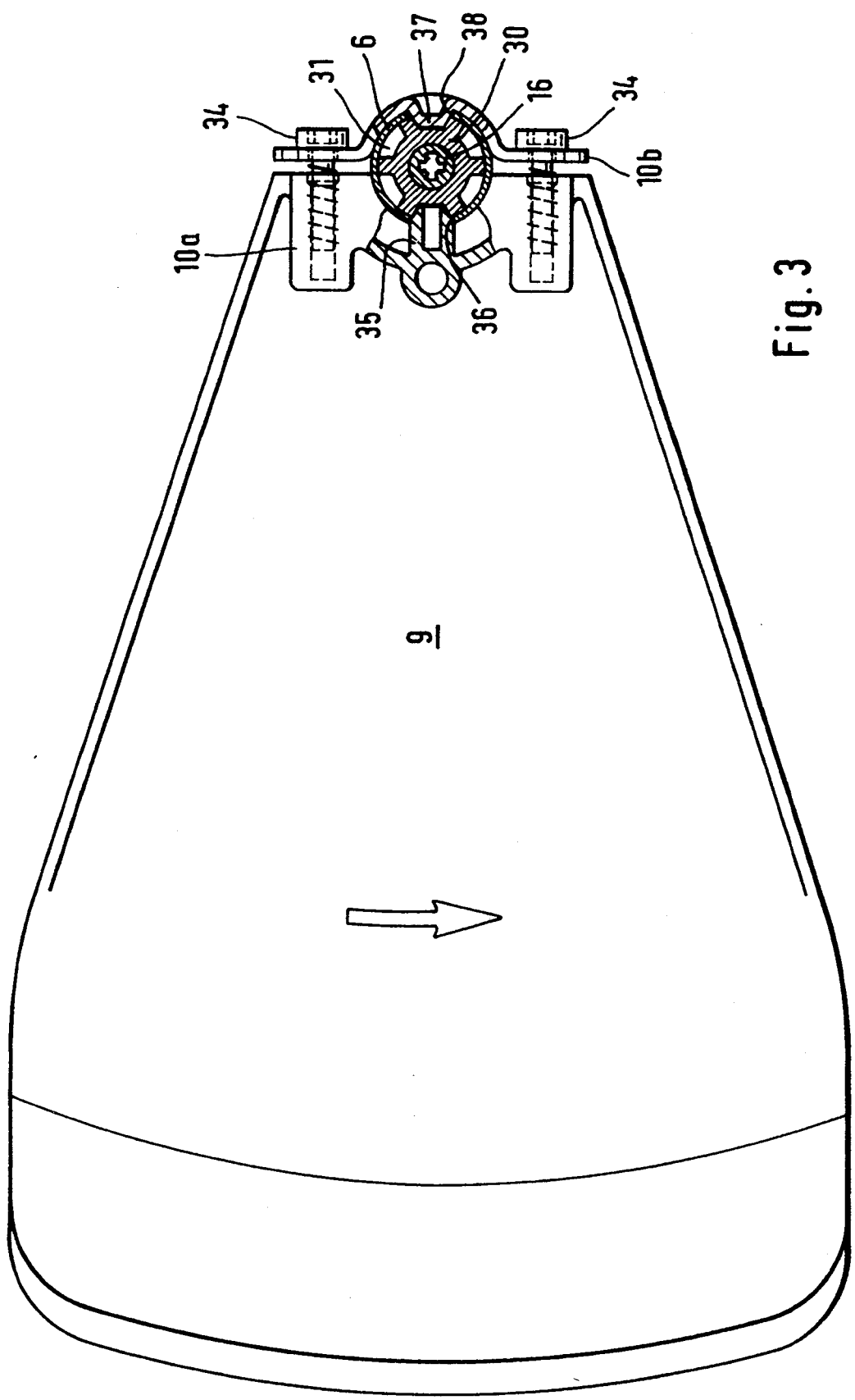
FIG. 3 is a section view taken along line III—III of FIGS. 2 and 5.

As shown in FIG. 3, the sleeve bearing 30 has slots 31 extending axially on its outer periphery. These slots 31 are preferably closed at their ends facing toward the cutterhead 7. The end 30a of the sleeve bearing 30 further carries a collar 32 which is configured to have a diameter slightly greater than the sleeve bearing 30. The outer diameter of the sleeve bearing 30 is adapted to the inner diameter of the end section 6 of the guide tube 5 so that the sleeve bearing is easily inserted substantially without play in the end section 6 of the guide tube. The insertion depth is delimited by the contact engagement of the collar 32 on the end face 33 of the end section 6 with the end face 33 facing toward the cutterhead 7. The collar 32 thereby advantageously closes the end of the guide tube.

After the sleeve bearing 30 is inserted, the two-part collar assembly 10 is placed around the end section 6 and the two parts of the collar assembly are joined to each other with attachment screws 34. The screws 34 are tightened so that the guide tube 5 elastically deforms in the region of the open end section 6 and the sleeve bearing 30 is preferably clamped tight radially over its entire axial length and thereby fixed axially. The lateral forces in the apparatus which occur during use are reliably received in this way.

The one collar half 10a is preferably made of plastic and has an inner stop 35 which projects radially into the guide tube through a window 36 in the end section 6 thereof. The window 36 lies at the elevation of the sleeve bearing 30. In the same way, the collar half 10b, which is preferably made of metal, carries an inner stop 37 on the inner side thereof facing toward the guide tube. The stop 37 projects radially into the guide tube through a corresponding window 38 in the guide tube. The windows 36 and 38 and the respective stops 35 and 37 lie diametrically opposite each other and preferably at the same elevation. The stops 35 and 37 can be so dimensioned that the sleeve bearing 30 is held radially between the stops 35 and 37. The stops 35 and 37 position the collar assembly 10 and the protective shield 9 held thereon and also engage in arbitrarily shaped recesses of the sleeve bearing in order to fix the sleeve bearing so that it cannot rotate. The stops 35 and 37 are configured so that they are adapted to the form of the slots 31 (FIG. 3) so that the stops 35 and 37, which project into the slots 31, simultaneously hold the sleeve bearing in the peripheral direction in a form-tight manner and especially so that there is no play.

The collar half 10a is a carrier for the protective shield 9 so that, after assembly of the protective shield 9, the sleeve bearing 30 is also held in the end section 6 of the guide tube so as not to be axially separable therefrom whereby the cutterhead 7 is fixed so as to be rotatable on the guide tube. The drive shaft 5a of the guide tube 5 engages in an axial receiving bore 16b of the bearing section 16 so that it cannot rotate with respect thereto and establishes the drive connection to the drive motor 4.

An excellent lubrication of the sleeve bearing for a long period of operational use is guaranteed if lubricating grease is packed into the end section before the sleeve bearing 30 is inserted. The lubricating grease acquires a low viscosity and flows unassisted into the regions to be lubricated because of the heat developed in the sleeve bearing.

As shown in FIG. 4, and to reliably prevent the sleeve bearing 30 from overheating, the sleeve bearing, with its peripheral surface, lies in a large area surface-to-surface contact with the inner surface of the end section 6 of the guide tube made of metal. The peripheral surface of the sleeve bearing 30 is interrupted only by two axial slots 31 in which the stops 35 and 37 engage so that the hold is without play in the peripheral direction. The sleeve bearing 30 is fixed with the aid of the stops 35 and 37 in the end section 6 so that it cannot separate axially and yet can be exchanged.

Figure 5:
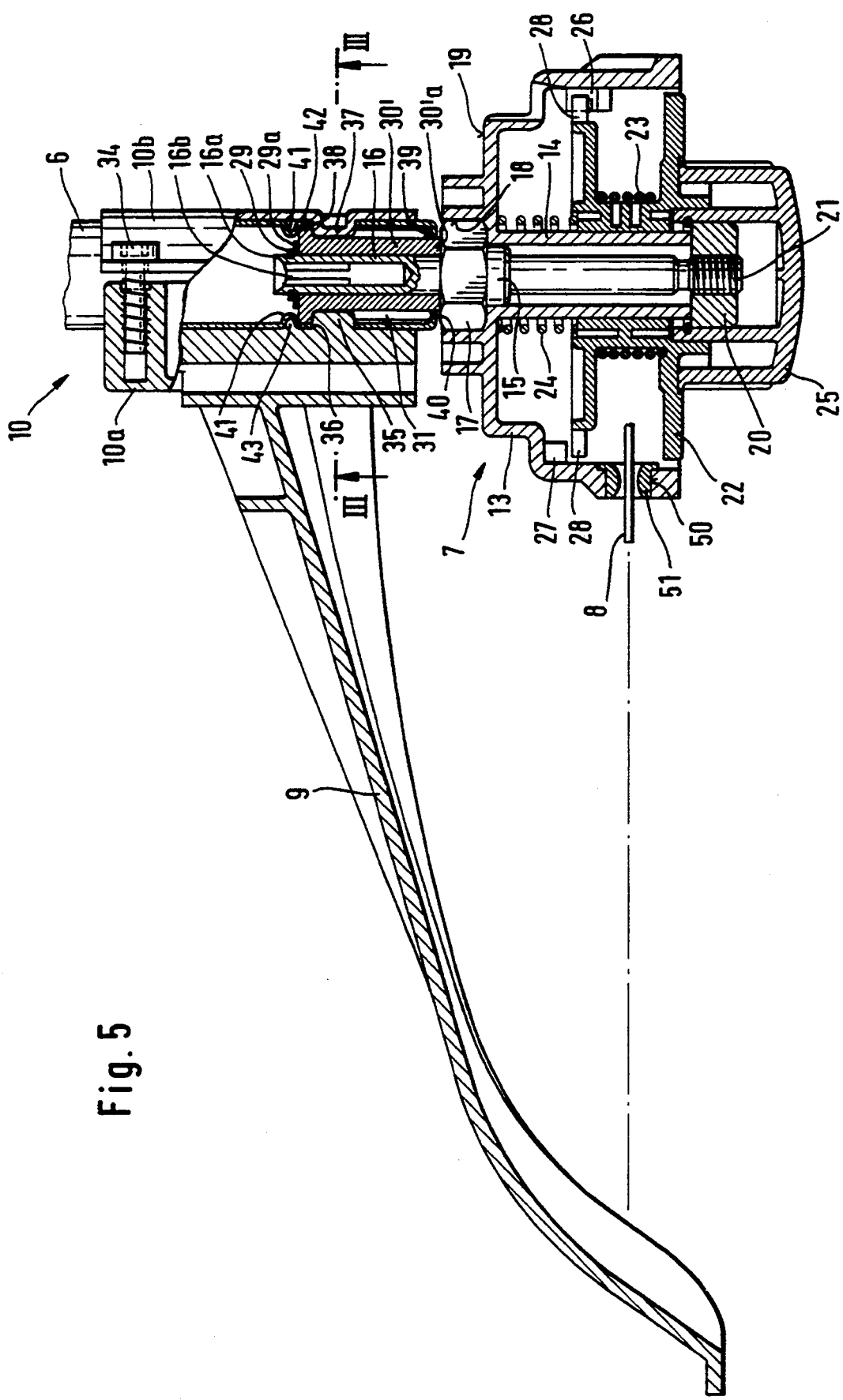
FIG. 5 is a section view taken through another embodiment of a cutterhead of the vegetation cutter apparatus held on the lower end section of the guide tube.

The embodiment shown in FIG. 5 corresponds to the assembly according to FIG. 2 and, for this reason, the same reference numerals are used for the same parts.

The sleeve bearing 30' held axially captive on the bearing section 16 is used in the embodiment of FIG. 5 and projects slightly with its end 30'a from the end section 6 of the guide tube. The projecting end section 30'a faces toward the cutterhead 7 and has a diameter less than the outer diameter of the rest of the sleeve bearing 30'. The flanged edge 40 of the end section 6 is in contact engagement with the annular shoulder 39 formed by the stepped diameter. The annular shoulder 39 is interrupted by the slots 31. A seal-tight end of the end section 6 on the sleeve bearing 30' is provided by the flanged edge 40 so that the interior space of the guide tube is closed against the penetration of dirt.

Inner stops, or abutments, 41 are provided in the interior of the end section for limiting the axial insertion depth. The inner stops 41 can be in the form of beads pressed into the wall of the end section 6 or can also comprise a peripherally extending annular bead. The inner stops 41 lie axially above the windows 36 and 38 so that an annular flange 42, which is formed on the inner end of the sleeve bearing 30', is held so as to be axially captive between the inner stops 41 and the radially inwardly projecting stops 35 and 37 of the collar halves 10a and 10b. The annular flange 42 closes the axial slots 31 at the ends thereof facing toward the interior space of the end section 6 of the guide tube.

By means of the inner stops 41 and the flanged edge 40, the sleeve bearing 30' is held axially captive in the end section 6 also when the collar assembly 10 is disassembled so that the cutterhead 7 remains attached to the guide tube. The stops 35 and 37 of the collar assembly 10 define an additional holding means during operation of the vegetation cutter apparatus. Preferably, the crimps or beads 41 are impressed by a projection 43 on the inner periphery of the collar assembly during the first assembly. The stops 35 and 37 are so dimensioned that the sleeve bearing 30' is fixed axially without receiving radial forces as well as being fixed form tight in the peripheral direction.

Figure 6:
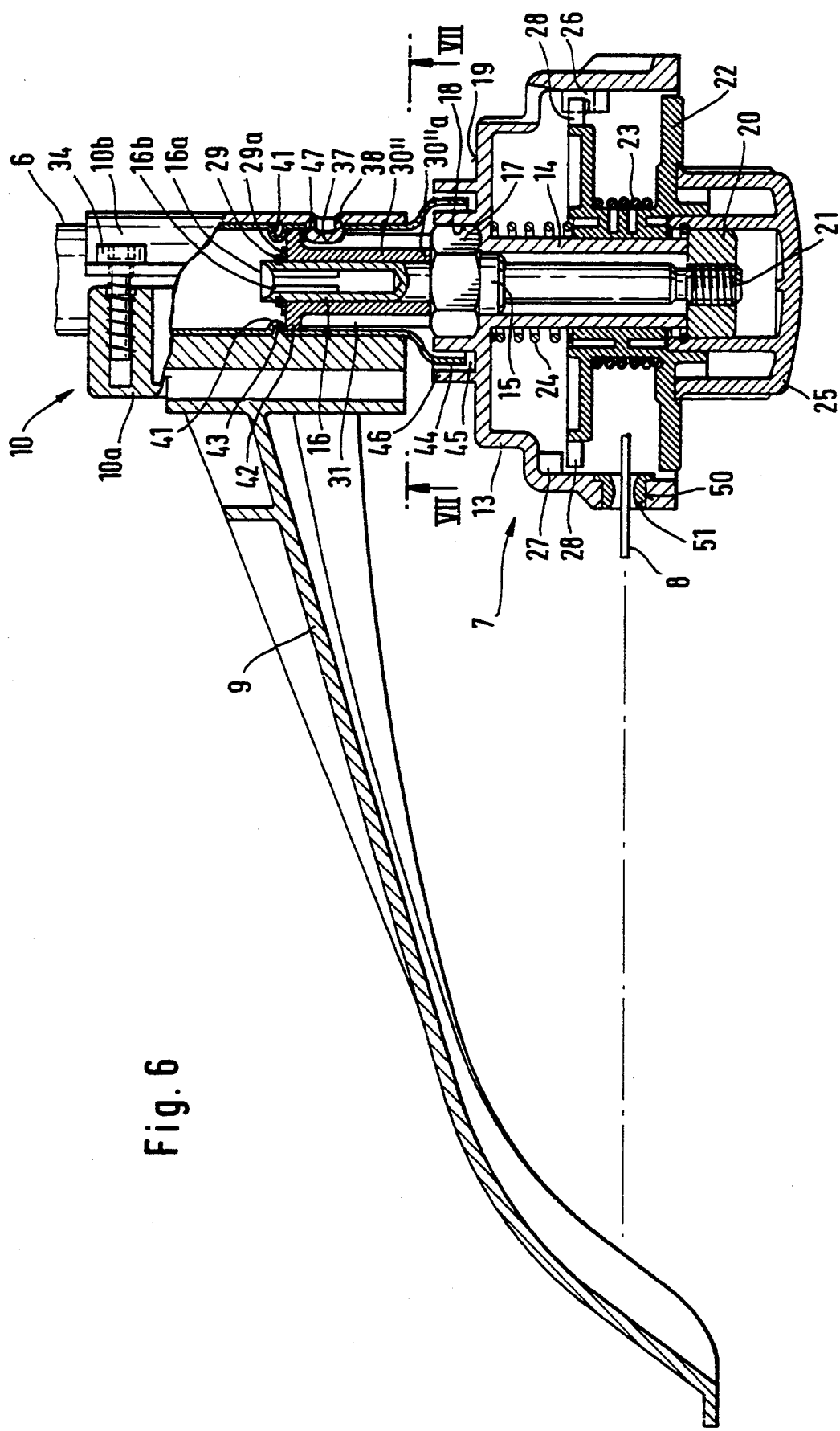
FIG. 6 is a section view taken through a further embodiment of a cutterhead of a vegetation cutter apparatus held on the lower end section of a guide tube; and, FIG. 7 is a section view taken along line VII—VII of FIG. 6.
Figure 7:
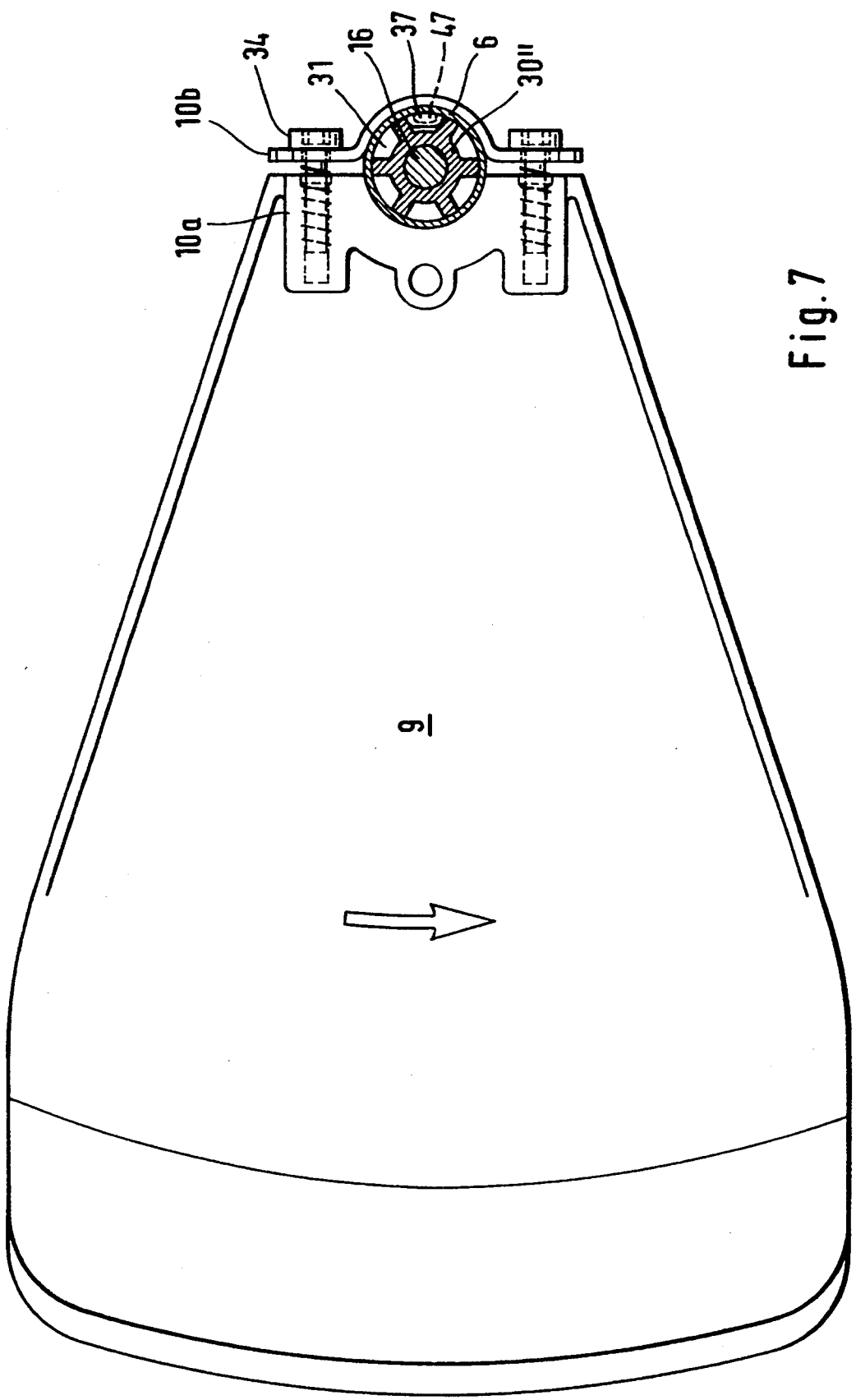

The embodiment of FIGS. 6 and 7 corresponds to the previously described embodiments with respect to its assembly and, for this reason, the same parts are identified by like reference numerals. The sleeve bearing 30" is held axially between the form-fit section 17 of the shaft stub 15 and the holding ring 29. The sleeve bearing 30" has an annular flange 42 on its inner end and this flange lies in contact engagement with the inner stops 41 of the end section 6 for delimiting the insertion depth. The sleeve bearing 30" has an end 30"a facing toward the cutterhead 7 and the end section 6 projects beyond this end 30"a and is expanded in its diameter. The expanded end 44 of the end section 6 engages in an annular slot 45 which is provided between the receptacle 18 and an annular wall 46 surrounding the receptacle. The annular slot 45 is on the end face 19 of the base housing 13 facing toward the guide tube. A type of labyrinth seal is provided against the penetration of dirt by the overlapping of end 44 with the annular wall 46 of the base housing 13.

Before the first assembly of the collar assembly 10, a tab 47 projects into the window 38 in the end section 6. The tab is provided on the edge of the window 38 next to the inner stop 41. During assembly of the collar assembly 10, the stop 37 bends over the tab 47 radially inwardly into the slot 31 whereby the flange 42 of the sleeve bearing 30" is held axially captive substantially without play between the bent-over tab 47 and the inner stop 41.

In the embodiment of FIGS. 6 and 7, only the collar half 10b carries a stop 37 whereas the collar half 10a has only a projection 43 which engages in the bead of the inner stop 41 and holds the collar half 10a axially in a form-tight manner on the end section 6.

It is understood that the foregoing description is that of the preferred embodiments of the invention and that various changes and modifications may be made thereto without departing from the spirit and scope of the invention as defined in the appended claims.

What is claimed is:

1. A vegetation cutter apparatus comprising:
   a drive motor;
   a guide tube having an end connected to said drive motor and having an end section remote from said drive motor;
   said end section having an interior space;
   a drive shaft rotatably journalled in said guide tube;
   said drive shaft having a first end connected to said drive motor and having a second end;
   a sleeve bearing mounted in said interior space of said end section;
   a cutterhead having an upwardly extending elongated bearing portion in rotational contact with a substantial length of said sleeve bearing such that it is rotatably journalled in said sleeve bearing, said elongated bearing portion being connected to said second end of said drive shaft so as to be driven by said drive motor via said drive shaft;
   a collar assembly engaging around and holding said end section with said sleeve bearing being held in said interior space of said end section so as to permit said sleeve bearing to be exchanged;
   said collar assembly including stop means radially penetrating said end section for axially holding said sleeve bearing in said end section and for engaging said sleeve bearing to hold said sleeve bearing to prevent a rotational movement of said sleeve bearing relative to said end section;
   said sleeve bearing having an inner end facing away from said cutterhead; and,
   depth limit means including an inner abutment on said guide tube for contact engaging said sleeve bearing at said inner end thereof.

2. The vegetation cutter apparatus of claim 1, said end section having an inner diameter; and, said sleeve bearing having an outer diameter slightly less than said inner diameter so that said sleeve bearing is easily inserted substantially without play into said end section.

3. The vegetation cutter apparatus of claim 1, said collar assembly including a protective shield extending therefrom.

4. The vegetation cutter apparatus of claim 1, said inner abutment being formed by a crimp in the tubular wall of said end section of said guide tube.

5. The vegetation cutter apparatus of claim 1, said collar assembly having a projection formed thereon and impressing a crimp into said end section when said collar assembly is engaged around said end section; and, said crimp defining said inner abutment.

6. The vegetation cutter apparatus of claim 1, said sleeve bearing having an inner end facing away from said cutterhead; flange means formed on said inner end of said sleeve bearing; and, a bent-over tab formed in said end section and extending radially into a slot disposed in said sleeve bearing and coacting with said flange means to hold said sleeve bearing axially captive in said end section.

7. A vegetation cutter apparatus comprising:
   a drive motor;

a guide tube having an end connected to said drive motor and having an end section remote from said drive motor;

said end section having an interior space;

a drive shaft rotatably journalled in said guide tube;

said drive shaft having a first end connected to said drive motor and having a second end;

a sleeve bearing mounted in said interior space of said end section;

a cutterhead rotatably journalled in said sleeve bearing and connected to said second end of said drive shaft so as to be driven by said drive motor via said drive shaft;

a collar assembly engaging around and holding said end section with said sleeve bearing being held in said interior space of said end section so as to permit said sleeve bearing to be exchanged;

said collar assembly including stop means radially penetrating said end section for axially holding said sleeve bearing in said end section and for engaging said sleeve bearing to hold said sleeve bearing to prevent a rotational movement of said sleeve bearing relative to said end section;

said end section having an inner diameter;

said sleeve bearing having an outer diameter slightly less than said inner diameter so that said sleeve bearing is easily inserted substantially without play into said end section; and, said sleeve bearing having an outer surface defining said outer diameter and having a plurality of slots formed in said outer surface for cooperation with said stop means.

8. The vegetation cutter apparatus of claim 7, said sleeve bearing having an inner end facing away from said cutterhead; and, said slots being closed at said inner end.

9. The vegetation cutter apparatus of claim 7, said stop means being two stops formed on said collar assembly engaging selected ones of said slots of said sleeve bearing for holding said sleeve bearing form tight between said stops.

10. A vegetation cutter apparatus comprising:

a drive motor;

a guide tube having an end connected to said drive motor and having an end section remote from said drive motor;

said end section having an interior space;

a drive shaft rotatably journalled in said guide tube;

said drive shaft having a first end connected to said drive motor and having a second end;

a sleeve bearing mounted in said interior space of said end section;

a cutterhead rotatably journalled in said sleeve bearing and connected to said second end of said drive shaft so as to be driven by said drive motor via said drive shaft;

a collar assembly engaging around and holding said end section with said sleeve bearing being held in said interior space of said end section so as to permit said sleeve bearing to be exchanged;

said collar assembly including stop means radially penetrating said end section for axially holding said sleeve bearing in said end section and for engaging said sleeve bearing to hold said sleeve bearing to prevent a rotational movement of said sleeve bearing relative to said end section;

said end section having an inner diameter;

said sleeve bearing having an outer diameter slightly less than said inner diameter so that said sleeve bearing is easily inserted substantially without play into said end section; and, said sleeve bearing having an outer surface defining said outer diameter and a plurality of slots formed in said outer surface; and, said stop means engaging at least one of said slots.

11. The vegetation cutter apparatus of claim 10, said sleeve bearing extending along and around a longitudinal axis and said at least one slot having a predetermined form; and, said stop means having a form corresponding to said form of said at least one slot so as to engage said one slot such that there is substantially no play in a direction concentric to said longitudinal axis.

12. A vegetation cutter apparatus comprising:

a drive motor;

a guide tube having an end connected to said drive motor and having an end section remote from said drive motor;

said end section having an interior space;

a drive shaft rotatably journalled in said guide tube;

said drive shaft having a first end connected to said drive motor and having a second end;

a sleeve bearing mounted in said interior space of said end section;

a cutterhead rotatably journalled in said sleeve bearing and connected to said second end of said drive shaft so as to be driven by said drive motor via said drive shaft;

a collar assembly engaging around and holding said end section with said sleeve bearing being held in said interior space of said end section so as to permit said sleeve bearing to be exchanged;

said collar assembly including stop means radially penetrating said end section for axially holding said sleeve bearing in said end section and for engaging said sleeve bearing to hold said sleeve bearing to prevent a rotational movement of said sleeve bearing relative to said end section;

said end section having an inner diameter;

said sleeve bearing having an outer diameter slightly less than said inner diameter so that said sleeve bearing is easily inserted substantially without play into said end section; and, said sleeve bearing having an outer surface and having at least one slot formed in said outer surface; and, said stop means being a stop formed on said collar assembly penetrating said end section to engage and hold said sleeve bearing in said slot thereof.

13. A vegetation cutter apparatus comprising:

a drive motor;

a guide tube having an end connected to said drive motor and having an end section remote from said drive motor;

said end section having an interior space;

a drive shaft rotatably journalled in said guide tube;

said drive shaft having a first end connected to said drive motor and having a second end;

a sleeve bearing mounted in said interior space of said end section;

a cutterhead having an upwardly extending elongated bearing portion in rotational contact with a substantial length of said sleeve bearing such that it is rotatably journalled in said sleeve bearing, said elongated bearing portion being connected to said second end of said drive shaft so as to be driven by said drive motor via said drive shaft;

a collar assembly engaging around and clamping said end section such that said sleeve bearing is frictionally held against axial movement in said interior space of said end section and so as to permit said sleeve bearing to be exchanged upon unclamping of the collar assembly;

said collar assembly including stop means radially penetrating said end section for engaging said sleeve bearing without penetrating an outer surface of said sleeve bearing to hold said sleeve bearing to prevent a rotational movement of said sleeve bearing relative to said end section;

said end section having an inner diameter; and, said sleeve bearing having an outer diameter slightly less than said inner diameter so that said sleeve bearing is easily inserted substantially without play into said end section.

14. The vegetation cutter apparatus of claim 13, further comprising depth limiting means for limiting the depth to which said sleeve bearing is inserted into said end section.

15. The vegetation cutter apparatus of claim 14, said end section having an outer free end face facing toward said cutterhead; said sleeve bearing having an outer end facing toward said cutterhead; and, said depth limit means comprising an annular flange formed at said outer end of said sleeve bearing contact engaging said free end face of said end section when said sleeve bearing is seated in said end section.

16. A vegetation cutter apparatus comprising:
a drive motor;
a guide tube having an end connected to said drive motor and having an end section remote from said drive motor;
said end section having an interior space;
a drive shaft rotatably journalled in said guide tube;
said drive shaft having a first end connected to said drive motor and having a second end;
a sleeve bearing mounted in said interior space of said end section;
a cutterhead rotatably journalled in said sleeve bearing and connected to said second end of said drive shaft so as to be driven by said drive motor via said drive shaft;
a collar assembly engaging around and holding said end section with said sleeve bearing being held in said interior space of said end section so as to permit said sleeve bearing to be exchanged;
said collar assembly including stop means radially penetrating said end section for axially holding said sleeve bearing in said end section and for engaging said sleeve bearing to hold said sleeve bearing to prevent a rotational movement of said sleeve bearing relative to said end section;
said end section having an inner diameter;
said sleeve bearing having an outer diameter slightly less than said inner diameter so that said sleeve bearing is easily inserted substantially without play into said end section; and,
said end section having an outer end portion facing toward said cutterhead; said outer end portion being bent over inwardly to define a flanged end of said end section; said sleeve bearing having a lower end facing toward said cutterhead; and, said lower end having a diameter less than the rest of said sleeve bearing and said lower end being in contact engagement with said flanged end of said end section.

17. A vegetation cutter apparatus comprising:
a drive motor;
a guide tube having an end connected to said drive motor and having an end section remote from said drive motor;
said end section having an interior space;
a drive shaft rotatably journalled in said guide tube;
said drive shaft having a first end connected to said drive motor and having a second end;
a sleeve bearing mounted in said interior space of said end section;
a cutterhead rotatably journalled in said sleeve bearing and connected to said second end of said drive shaft so as to be driven by said drive motor via said drive shaft;
a collar assembly engaging around and holding said end section with said sleeve bearing being held in said interior space of said end section so as to permit said sleeve bearing to be exchanged;
said collar assembly including stop means radially penetrating said end section for axially holding said sleeve bearing in said end section and for engaging said sleeve bearing to hold said sleeve bearing to prevent a rotational movement of said sleeve bearing relative to said end section;
said end section having an inner diameter;
said sleeve bearing having an outer diameter slightly less than said inner diameter so that said sleeve bearing is easily inserted substantially without play into said end section; and,
said sleeve bearing having a Lower end facing toward said cutterhead; said end section having an end portion facing toward said cutterhead and said end portion being expanded in diameter with respect to the rest of said guide tube and extending downwardly beyond said lower end of said sleeve bearing; and, said cutterhead having an upper end face and having wall means forming an annular slot on said upper end face for receiving said end portion therein.

18. A vegetation cutter apparatus comprising:
a drive motor;
a guide tube having an end connected to said drive motor and having an end section remote from said drive motor;
said end section having an interior space;
a drive shaft rotatably journalled in said guide tube;
said drive shaft having a first end connected to said drive motor and having a second end;
a sleeve bearing mounted in said interior space of said end section;
a cutterhead having an upwardly extending elongated bearing portion in rotational contact with a substantial length of said sleeve bearing such that it is rotatably journalled in said sleeve bearing, said elongated bearing portion being connected to said second end of said drive shaft so as to be driven by said drive motor via said drive shaft;
a collar assembly engaging around and holding said end section with said sleeve bearing being held in said interior apace of said end section so as to permit said sleeve bearing to be exchanged;
said collar assembly including stop means radially penetrating said end section for axially holding said sleeve bearing in said end section and for engaging said sleeve bearing to hold said sleeve bearing to prevent a rotational movement of said sleeve bearing relative to said end section; and, said stop means being radially inserted into at least one of a plurality of slots disposed in said sleeve bearing.

19. A vegetation cutter apparatus comprising:

a drive motor;

a guide tube having an end connected to said drive motor and having an end section remote from said drive motor;

said end section having an interior space;

a drive shaft rotatably journalled in said guide tube;

said drive shaft having a first end connected to said drive motor and having a second end;

a sleeve bearing mounted in said interior space of said end section;

a cutterhead rotatably journalled in said sleeve bearing and connected to said second end of said drive shaft so as to be driven by said drive motor via said drive shaft;

a collar assembly engaging around and holding said end section with said sleeve bearing being held in said interior space of said end section so as to permit said sleeve bearing to be exchanged;

said collar assembly including stop means radially penetrating said end section for engaging said sleeve bearing to hold said sleeve bearing to prevent a rotational movement of said sleeve bearing relative to said end section;

said end section having an inner diameter;

said sleeve bearing having an outer diameter slightly less than said inner diameter so that said sleeve bearing is easily inserted substantially without play into said end section;

said stop means being radially inserted into slots disposed in said sleeve bearing; and, said collar assembly being a two part assembly enclosing said end section;

fastener means for holding the two parts of said collar assembly together on said end portion;

said stop means being formed on said parts and being directed radially inwardly and holding said sleeve bearing; and, said fastener means being tightened to transmit a radially inwardly directed force from said collar assembly to said end section thereby radially clamping said sleeve bearing in said end section.

* * * * *